United States Patent
Konrad et al.

(10) Patent No.: US 11,813,976 B2
(45) Date of Patent: Nov. 14, 2023

(54) DOOR HANDLE FOR A VEHICLE DOOR

(71) Applicant: DAIMLER AG, Stuttgart (DE)

(72) Inventors: Tobias Konrad, Böblingen (DE); Martin Lindmayer, Sulz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 151 days.

(21) Appl. No.: 17/597,256

(22) PCT Filed: Jun. 25, 2020

(86) PCT No.: PCT/EP2020/067913
§ 371 (c)(1),
(2) Date: Dec. 30, 2021

(87) PCT Pub. No.: WO2021/001264
PCT Pub. Date: Jan. 7, 2021

(65) Prior Publication Data
US 2022/0314874 A1 Oct. 6, 2022

(30) Foreign Application Priority Data
Jul. 4, 2019 (DE) ..................... 10 2019 004 707.9

(51) Int. Cl.
*B60Q 1/26* (2006.01)
*E05B 85/10* (2014.01)
(Continued)

(52) U.S. Cl.
CPC ......... *B60Q 1/2669* (2013.01); *B60Q 1/2692* (2013.01); *B60Q 1/323* (2013.01); *E05B 85/107* (2013.01); *B60R 25/24* (2013.01)

(58) Field of Classification Search
CPC .... B60Q 1/2669; B60Q 1/2692; B60Q 1/323; E05B 85/107; B60R 25/24
(Continued)

(56) References Cited

U.S. PATENT DOCUMENTS

2006/0104075 A1\* 5/2006 Misawa ............... B60Q 1/2669
362/501
2007/0195542 A1\* 8/2007 Metros ................. B60Q 1/2669
362/501

FOREIGN PATENT DOCUMENTS

DE 19843594 A1 4/2000
DE 102004033896 A1 2/2006
(Continued)

OTHER PUBLICATIONS

International Search Report dated Nov. 20, 2020 in related/corresponding International Application No. PCT/EP2020/067913.
(Continued)

*Primary Examiner* — Laura K Tso
(74) *Attorney, Agent, or Firm* — PATENT PORTFOLIO BUILDERS PLLC

(57) ABSTRACT

A door handle for a vehicle door of a motor vehicle includes a carrier plate, a handle part, and at least one lighting device arranged in/on the carrier plate with at least one lighting element and/or a light guide element. The lighting element and/or the light guide element are adjustable between an extended position of use and a retracted non-use position. The at least one lighting element and/or the at least one light guide element projects, in its extended position of use, into a recess of the handle part and thus illuminates at least parts of the handle part and/or of an area surrounding the handle part.

10 Claims, 3 Drawing Sheets

Figure 1:
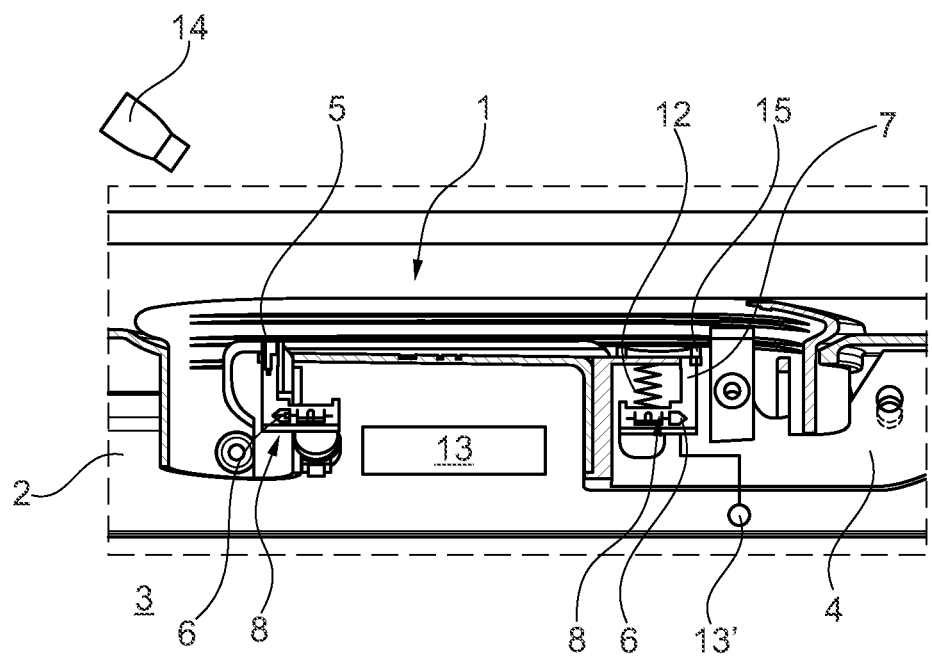

(51) Int. Cl.
  *B60Q 1/32* (2006.01)
  *B60R 25/24* (2013.01)
(58) Field of Classification Search
  USPC .................................................. 362/511, 501
  See application file for complete search history.

(56) References Cited

FOREIGN PATENT DOCUMENTS

| | | |
|---|---|---|
| DE | 102006019284 A1 | 10/2007 |
| DE | 102008010966 A1 | 8/2009 |
| DE | 102015008565 A1 | 1/2017 |
| WO | 2008120067 A2 | 10/2008 |

OTHER PUBLICATIONS

Office Action dated Apr. 20, 2020 in related/corresponding DE Application No. 10 2019 004 707.9.
Written Opinion dated Nov. 20, 2020 in related/corresponding International Application No. PCT/EP2020/067913.

\* cited by examiner

DOOR HANDLE FOR A VEHICLE DOOR

BACKGROUND AND SUMMARY OF THE INVENTION

Exemplary embodiments of the present invention relate to a door handle for a vehicle door, as well as to a motor vehicle having a vehicle door, a door lock, and a door handle of this kind.

DE 2004 033 896 A1 describes a generic door handle for a vehicle door with a lighting device that is arranged in the region of the door handle and can be activated with the aid of a remote control device. The remote control device is an electronic key which is connected to the lighting device for communication therewith, in such a way that the lighting device is activated in dimmed form with the aid of the electronic key when the ignition is switched off, provided that a driver approaches the vehicle, wherein the door handle lighting can additionally be used as marking lighting when not in use. This is intended to allow the lighting device to take on several functions.

DE 10 2006 019 284 A1 discloses a vehicle with a vehicle door and with an unlocking mechanism by which the vehicle door can be unlocked. Also provided is a front-area lighting system or a door handle lighting system for front-area light for illuminating the surroundings of the vehicle door or for generating door handle light for illuminating the door handle. Furthermore, a sensor device is provided for generating and outputting a sensor signal in response to front-area light or door handle light reflected by an object, as well as a control device that automatically activates the unlocking mechanism as a function of the sensor signal.

The lighting of door handles in vehicles, in particular in motor vehicles, in particular direct or indirect lighting, is already known in many ways to increase the comfort of entry, wherein a light-emitting lighting element and/or a light-emitting light guide element must be integrated into surfaces of the vehicle door or a handle part of the door handle in such a way that it does not protrude interferingly above the door handle, in particular when the vehicle door is opened. Nevertheless, it must be arranged in such a way that it reliably illuminates the desired surface to be illuminated or the desired element to be illuminated, for example a handle cavity. As a solution for this, it is conceivable, for example, to integrate the lighting element or the light guide element into the handle part of the door handle, thereby allowing illumination, for example, of a handle cavity, and/or of a surrounding area of the door handle. However, a disadvantage of such an embodiment is that the lighting element is in this case located in the handle part of the door handle and thus wiring must be routed into the handle part, which is complex and costly from a design viewpoint.

The present invention is therefore concerned with the problem of providing an improved or at least an alternative embodiment for a door handle of the type described, which in particular overcomes the disadvantages known from the prior art.

The present invention is based on the general concept of integrating a lighting device in a carrier plate of a door handle for a vehicle door and at the same time equipping it with at least one lighting element or light guide element that can be adjusted between an extended position of use and a retracted non-use position, which makes it possible to provide reliable illumination of the handle part or of a handle part environment without the lighting device having to be arranged in the handle part and requiring complex wiring and without the lighting element or light guide element forming an ever-present interfering contour. The door handle according to the invention for a vehicle door, in particular of a motor vehicle, has the aforementioned carrier plate and a handle part which can be adjusted thereto, in particular which can be moved or pivoted, via which handle part the vehicle door can be opened manually. Also provided is a lighting device with at least one lighting element, for example a light-emitting diode, and/or a light guide element, which can be adjusted between an extended position of use and a retracted and thus an interference-free non-use position. In its extended position of use, the at least one lighting element and/or light guide element projects at least partially into a recess in the handle part and thus illuminates at least parts of the handle part and/or the area surrounding the handle part. With the door handle according to the invention, it is thus possible for the first time to relocate a lighting device for illuminating, for example, a handle cavity or the handle part, which lighting device was previously arranged in a handle part of the door handle, into the carrier plate, whereby electrical wiring of the handle part, as well as an arrangement of the lighting device in the latter, can be completely omitted. By integrating the lighting device into the carrier plate, an arrangement of the same in a door exterior of the vehicle door can also additionally be avoided, which is advantageous, in particular with regard to an assembly or sealing effort. Due to the fact that the lighting element or the light guide element projects into a recess of the handle part in its extended position of use, it is easily possible to illuminate this handle part from the inside, in particular if, for example, an at least partially transparent plastic is used for the plastic used for the handle part. A particular ambience can additionally also be created by such an illuminated handle part, wherein it is also conceivable that the lighting element can light up in different colors, which can also be individually selected in particular.

It is also conceivable here that the handle part itself has at least one light guide element that guides the light coming from the lighting element and/or the light guide element into predefined areas of the handle part or the surroundings of the handle part. For example, the at least one light-conducting element can be linear and arranged in the handle part in such a way that, when lit up, it renders the handle part in the manner of a line drawing. Of course, it is also possible to illuminate emblems and symbols in the handle part by means of the at least one light-conducting element.

In an advantageous refinement of the solution according to the invention, the at least one lighting element and/or the at least one light guide element are/is retracted into the carrier plate and/or into the door handle in their/its non-use position. This offers the great advantage that the lighting element or the light guide element in its non-use position assumes a position free of interfering contours and thus does not protrude anywhere undesirably, and is also arranged in a protected manner in its non-use position. This can reduce the risk of damage in particular.

It is expedient that the handle part can be moved relative to the carrier plate between a position of use and a non-use position, wherein the at least one lighting element and/or the at least one light guide element is in its extended position of use, provided that the handle part is also in its position of use. If, for example, an adjustment device of the door handle is activated by means of an electronic key, in particular by means of a radio remote control, and the handle part is thus moved into its position of use, for example extended or pivoted out, the at least one lighting element and/or the at least one light guide element is also moved into its extended position of use at the same time. In this way, it can be achieved that the lighting element or the light guide element is only in its light-emitting position of use if illumination of the handle part or of the area surrounding the handle part is actually required, namely when the vehicle door is opened, for example, while it is in its retracted, non-use position when it is not needed. In this way, in particular, the presence of an interfering contour can also be avoided when a handle part is in its non-use position.

It is expedient that the at least one lighting element and/or the at least one light guiding element are/is pretensioned into its non-use position by means of a spring. The at least one lighting element or light guide element is thus moved into its position of use against the force of the spring, for example by means of an adjustment device, in particular by means of an electric motor, while in the event of a malfunction or non-functioning of the adjustment device, it is returned to its non-use position and fixed there solely due to the spring. In this way, it is always ensured that the lighting element or the light guide element can be moved to its non-use position in any case.

In a further advantageous embodiment of the solution according to the invention, the lighting element has at least one light-emitting diode (LED). Of course, it is conceivable here that a plurality of light-emitting diodes can be subsumed under such an LED, which can emit different colored light by means of different actuation. This makes it possible, in particular, to assign individually adjustable colors to the lighting element. Furthermore, such a light-emitting diode can also be dimmable, wherein it can even be provided that a natural incidence of light is measured via a corresponding sensor and the brightness of the at least one light-emitting diode is adjusted on the basis of the natural light present.

It is expedient that the handle part of the door handle is adjustable in translation or pivotably between its position of use and its non-use position. Thus, retractable and extendable handle parts as well as handle parts that can be pivoted in and out can be used with the door handle according to the invention.

The present invention is further based on the general idea of equipping a motor vehicle with a vehicle door, a door lock and a door handle described above. This makes it possible to transfer the advantages described with regard to the door handle to the motor vehicle as well, so that, for example, the retractable and extendable lighting element or light guide element does not form an interfering contour in the non-use position. Furthermore, it is possible to arrange the light guide element or the lighting element in a protected manner in its non-use position, i.e., in its retracted position, whereby the risk of damage can be reduced. Furthermore, it is of particular advantage that an arrangement of the lighting device in the handle part of the door handle as well as an associated electrical wiring of the handle part can be completely omitted, whereby an assembly effort and thus also assembly and manufacturing costs can be reduced.

An electronic key for locking and unlocking the door lock is expediently provided in the motor vehicle according to the invention, wherein the door lock is connected to the door handle for communication therewith, in such a way that when the door lock is unlocked by means of the electronic key, for example a radio remote control or a keyless go device, the at least one lighting element and/or the at least one light guide element is moved into its extended position of use. If, for example, the driver of the motor vehicle unlocks the door lock by means of the electronic key, the lighting element or the light guide element is extended and activated and the handle part of the door handle and/or the area surrounding the handle part is thus illuminated, which can significantly increase the handling comfort for the driver.

Further important features and advantages of the invention will become apparent from the dependent claims, from the drawings and from the associated description of figures provided on the basis of the drawings.

It is understood that the features mentioned above and those to be explained below can be used not only in the combination indicated in each case, but also in other combinations or on their own, without departing from the scope of the present invention.

Preferred exemplary embodiments of the invention are shown in the drawings and will be explained in more detail in the following description, wherein like refer-ence signs refer to like or similar or functionally like components.

BRIEF DESCRIPTION OF THE DRAWING FIGURES

Figure 2:
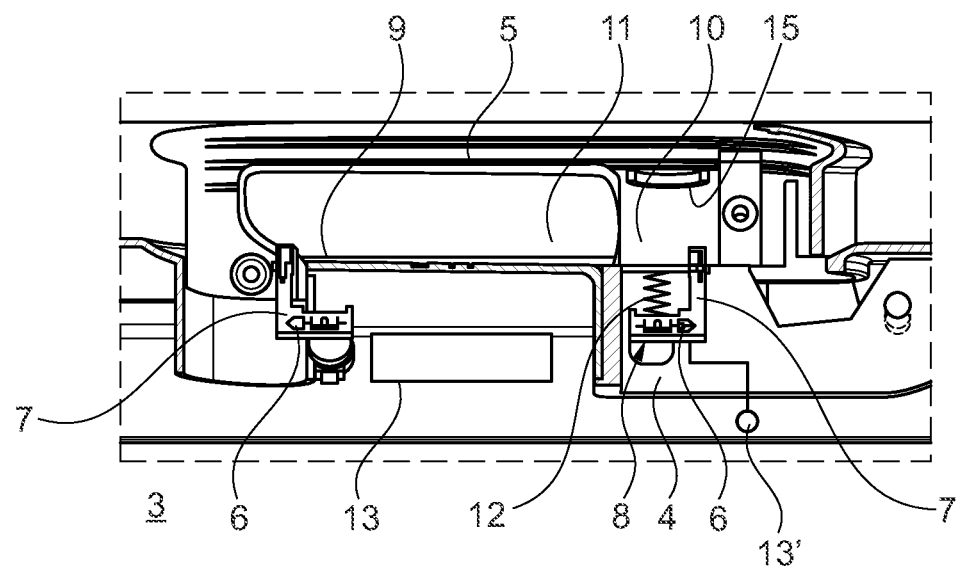
Figure 3:
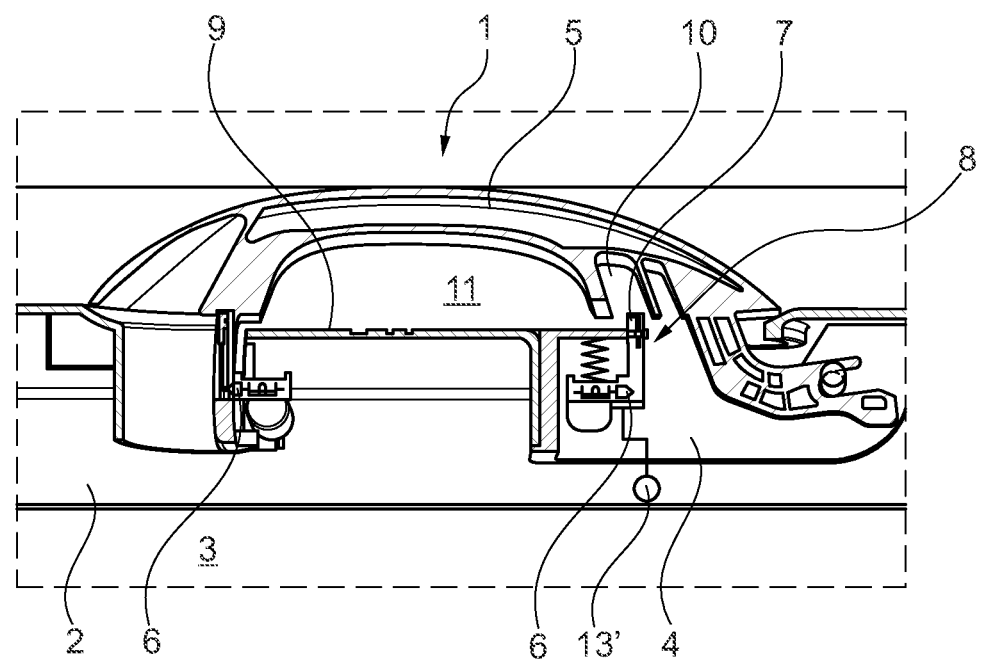

The figures show, schematically in each case:

FIG. 1 a sectional depiction through a door handle according to the invention in a vehicle door with the handle part in its non-use position and the lighting device deactivated, FIG. 2 a depiction as in FIG. 1, but with the lighting device activated and the door handle in its position of use, FIG. 3 a depiction as in FIG. 1, but with a door handle with a pivotable handle part.

Figure 4:
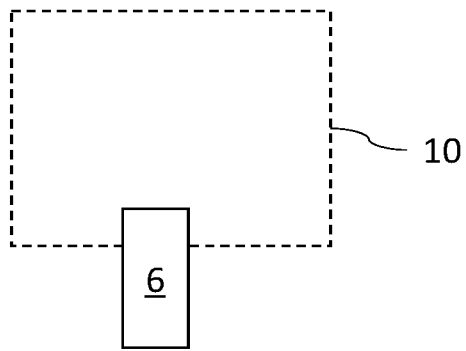
Figure 5:
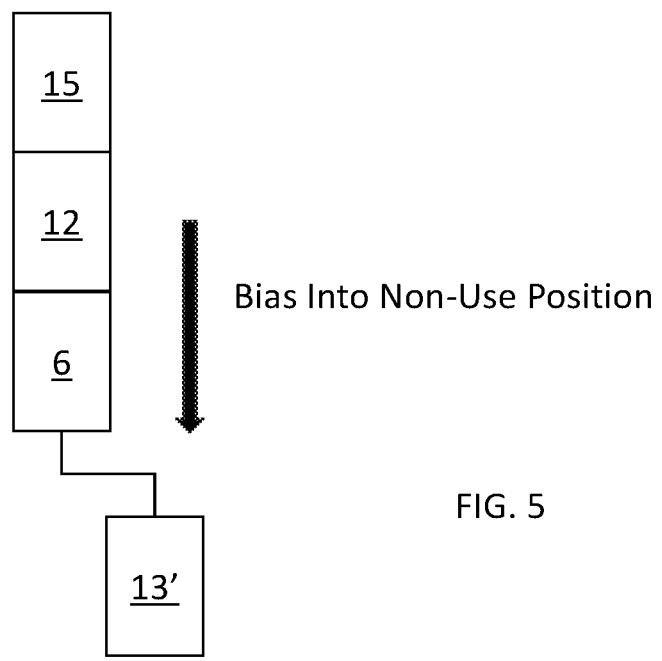

FIG. 4 schematically illustrates a lighting element in its extended use position in which the lighting element projects into the recess in the handle part and illuminates at least parts of the handle part or of an area surrounding the handle part, FIG. 5 schematically illustrates a lighting element biased into a non-use position by a spring, a stop surface that transfers the lighting element from its position of use into the non-use position, and an electric motor configured to adjust the lighting element between the use and non-use position.

DETAILED DESCRIPTION

According to FIGS. 1 to 3, a door handle 1 according to the invention for a vehicle door 2 of a motor vehicle 3 has a carrier plate 4 and a handle part 5. Also provided is a lighting device 8 with at least one lighting element 6 and/or a light guide element 7, which can be adjusted or moved between an extended position of use (see FIG. 2) and a retracted non-use position (see FIGS. 1 and 3). Looking further at FIGS. 1 to 3, it can be seen that on the door handles 1 shown there is provided a lighting device 8 with two lighting elements 6 and two light guide elements 7, of which only the right-hand one can be adjusted between an extended position of use and a retracted non-use position. The left-hand light guide element 7 is arranged in a stationary manner on the carrier plate 4 and serves, for example, in the activated state to illuminate a depression 9 in the handle part. At least one lighting element 6 and/or at least one light guide element 7 projects into a recess 10 in the handle part 5 in its extended position of use (see FIG. 2) and illuminates at least part of the handle part 5 and/or an area 11 surrounding the handle part. For this purpose, the handle part 5 can, for example, be made of at least partially translucent plastic, which can make it easier to find visually, especially in poor lighting conditions. FIG. 4 schematically illustrates the at least one lighting element 6 projecting into recess 10 in the handle part 5 in its extended position of use.

It is also conceivable that the handle part 5 itself has a light-conducting element, which is not shown in greater detail, which transmits the light coming from the lighting element 6 and/or the light guide element 7 into predefined areas of the handle part 5 or of the area 11 surrounding the handle part. This makes it possible, for example, to illuminate the handle part 5 in the manner of a line drawing. Of course, it is also possible to illuminate emblems and symbols in the handle part 5 by means of the at least one light conducting element.

The handle part 5 of the door handle 1 can be adjusted here in translation according to FIGS. 1 and 2, whereas it is pivotable according to FIG. 3.

With the door handle 1 according to the invention, it is possible for the first time to arrange the entire lighting device 8 with all lighting elements 6 as well as light guide elements 7 exclusively on or in the carrier plate 4 and thus to completely avoid a complex and possibly error-prone wiring of the handle part 5. Due to the additional possibility of adjusting the lighting element 6 and/or the light guide element 7 between an extended position of use and a retracted non-use position according to the invention, it is also possible to arrange the latter in a protected manner in the carrier plate 4 and to extend it into an illuminating position only when necessary, whereby a completely new lighting situation can additionally be created by the extendibility, which could previously only be realized with permanently extended lighting elements 6 or light guide elements 7. In this case, the permanently extended lighting elements 6 or the permanently extended light guide elements 7 would possibly lie in a direct haptic engagement area and thus cause ergonomic disadvantages due to an interfering contour. In addition, such permanently protruding lighting elements or light guide elements would be exposed to an increased risk of damage.

Looking at FIGS. 1 and 3, it can be seen that the at least one lighting element 6 and/or the at least one light guide element 7 is retracted into the carrier plate 4 and/or into the door handle 1 in its non-use position and is thus arranged in a protected manner.

According to FIGS. 1 and 2, the handle part 5 is arranged so as to be adjustable in translation relative to the carrier plate 4 and is shown in a retracted non-use position according to FIG. 1 and in an extended position of use according to FIG. 2, wherein the at least one lighting element 6 and/or the at least one light guide element 7 is in its extended position of use, provided that the handle part 5 is also in its extended position of use. The lighting element 6 or the light guide element 7 is thus extended only if the handle part 5 is also extended. According to FIGS. 1 and 2, it is intended that only the right-hand lighting element 6 or the right-hand light guide element 7 is moved into the position of use when the handle part 5 is moved into its extended position of use.

The at least one lighting element 6 and/or the at least one light guide element 7 can furthermore be biased into its non-use position by means of a spring 12, which is why the lighting element 6 or the light guide element 7 is extended exclusively by means of a corresponding adjustment device 13', for example an electric motor. FIG. 5 schematically illustrates an adjustment device 13' in the form of an electric motor configured to adjust at least the lighting element between the position of use and the non-use position of the at least one lighting device. This offers the great advantage that in the event of a failure of the adjustment device 13', the adjustable lighting element 6 or the adjustable light guide element 7 is transferred into its retracted non-use position by means of the spring 2, whereby a so-called fail-safe function can be achieved, since the lighting element 6 or the light guide element 7 is transferred into its retracted and thus protected position in the event of a failure of the adjustment device 13'. FIG. 5 schematically illustrates the at least one lighting element 6 biased into the non-use position of the at least one lighting device by of a spring 12.

The handle part 5 may furthermore have a stop surface 15 (see FIGS. 1 and 2) which, in the event of a malfunction of the spring 12, causes the lighting element 6 and/or the light guide element 7 to be transferred from its position of use to its non-use position as a result of the lighting element 6 and/or the light guide element 7 being displaced back into its non-use position via the stop surface 15 when the handle part 5 is retracted. FIG. 5 schematically illustrates a stop surface 15 which, in the event of a malfunction of the spring, causes the lighting element 6 to be transferred from its position of use into non-use position of the at least one lighting device.

An adjustment device 13 is also provided for adjusting the handle part 5, wherein the same, i.e., only one single adjustment device 13 or 13' can be used for adjusting the handle part 5 and the adjustable light guide element 7 or the adjustable lighting element 6, or separate adjustment devices 13 and 13' can be provided. However, an active transfer of the lighting element 6 or the light guide element 7 from its retracted non-use position to its extended position of use is preferably always carried out against the spring force of the spring 12. When using only a single adjustment device 13 or 13' for simultaneous adjustment of the handle part 5 and the lighting element 6 or the light guide element 7, an extension kinematic system (not shown in greater detail) is also provided, since an extension distance of the handle part 5 is significantly greater than an extension distance of the lighting element 6 or the light guide element 7.

According to FIG. 3, only the adjustment device 13' is required to move the lighting element 6 or the light guide element 7 into its extended position of use, since in this case the handle part 5 is not extended separately in order to reach an operable position. In this case, the handle part 5 is rather pivotably mounted on the carrier plate 4 and is permanently in its position of use.

The lighting device 8 can have here as a lighting element 6, for example, a light-emitting diode (LED) which, according to FIGS. 1 to 3, is integrated into a light guide element 7 and is thus adjusted together with the latter between the extended position of use and the retracted non-use position.

Furthermore, an electronic key 14 can be provided for locking and unlocking a door lock (not shown in greater detail), wherein this door lock is connected to the door handle 1 for communication therewith, in such a way that, when the door lock is unlocked by means of the electronic key 14, the at least one lighting element 6 and/or the at least one light guide element 7 is moved into its extended position of use. This provides a high degree of operating convenience, since when the electronic key 14, for example a radio remote control, is actuated, the handle part 5 and/or the area 11 surrounding the handle part is automatically illuminated, thereby significantly simplifying the manual opening of the motor vehicle 3.

With the motor vehicle 3 according to the invention and the door handle 1 according to the invention, it is above all possible to relocate lighting devices previously arranged in a handle part and associated wiring completely into the carrier plate 4, whereby the door handle 1 not only has a simpler design, but also requires less assembly effort. The extendable lighting device 8 or the extendable lighting element 6 and/or the extendable light guide element 7 can also prevent the latter from forming an undesirable interfering contour when not in use, wherein the extendibility nevertheless creates the possibility of being able to present lighting situations that could previously only be achieved with lighting devices that were always extended.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A door handle for a vehicle door of a motor vehicle, the door handle comprising:
   a carrier plate;
   a handle part; and
   at least one lighting device, wherein the at least one lighting device is arranged in the carrier plate or the at least one lighting device is arranged on the carrier plate, wherein the at least one lighting device has at least one lighting element or one light guide element that is adjustable between an extended position of use of the at least one lighting device and a retracted non-use position of the at least one lighting device, wherein the at least one lighting element or the at least one light guide element projects, in the extended position of use of the at least one lighting device, into a recess in the handle part and illuminates at least parts of the handle part or of an area surrounding the handle part.

2. The door handle of claim 1, wherein the at least one lighting element or the at least one light guide element is retracted into the carrier plate in the non-use position of the at least one lighting device.

3. The door handle of claim 1, wherein
   the handle part is moveable relative to the carrier plate between a position of use of the handle part and a non-use position of the handle part, and
   the at least one lighting element or the at least one light guide element is the extended position of use of the at least one lighting device when the handle part is in the position of use of the handle part.

4. The door handle of claim 1, wherein the at least one lighting element or the at least one light guide element is biased into the non-use position of the at least one lighting device by spring.

5. The door handle of claim 4, wherein the handle part has a stop surface which, in the event of a malfunction of the spring, causes the lighting element or the light guide element to be transferred from its position of use into non-use position of the at least one lighting device.

6. The door handle of claim 1, further comprising:
   an electric motor configured to adjust at least the lighting element or the light guide element between the position of use and the non-use position of the at least one lighting device,
   wherein the at least one lighting element has at least one light-emitting diode.

7. The door handle of claim 3, wherein the handle part is adjustable in translation or pivotably between the position of use and the non-use position of the handle part.

8. A motor vehicle, comprising:
   a vehicle door;
   a door lock; and
   a door handle, which comprises
      a carrier plate;
      a handle part; and
      at least one lighting device, wherein the at least one lighting device is arranged in the carrier plate or the at least one lighting device is arranged on the carrier plate, wherein the at least one lighting device has at least one lighting element or one light guide element that is adjustable between an extended position of use of the at least one lighting device and a retracted non-use position of the at least one lighting device, wherein the at least one lighting element or the at least one light guide element projects, in the extended position of use of the at least one lighting device, into a recess in the handle part and illuminates at least parts of the handle part or of an area surrounding the handle part.

9. The motor vehicle of claim 8, further comprising:
   an electronic key configured to lock and unlock the door lock, wherein the door lock is connected to the door handle for communication therewith, in such a way that the at least one lighting element or the at least one light guide element is moved into the extended position of use of the at least one lighting device when the door lock is unlocked by the electronic key.

10. The motor vehicle of claim 8, wherein the at least one lighting element or the at least one light guide element in the non-use position of the at least one lighting device is retracted into the carrier plate.

* * * * *